United States Patent [19]
Kincaid

[11] Patent Number: 6,046,511
[45] Date of Patent: Apr. 4, 2000

[54] FAULT TOLERANT POWER SUPPLY AND BUS TOPOLOGY FOR A DISTRIBUTED ARCHITECTURE SUPPLEMENTAL RESTRAINT SYSTEM

[75] Inventor: Kevin Dale Kincaid, Kokomo, Ind.

[73] Assignee: Delco Electronics Corporation, Kokomo, Ind.

[21] Appl. No.: 09/075,469

[22] Filed: May 8, 1998

[51] Int. Cl.[7] ........................................... G06F 1/26
[52] U.S. Cl. .................... 307/10.1; 280/728.1; 701/34; 701/45
[58] Field of Search ............................ 307/10.1; 180/271, 180/282; 340/436; 701/34, 45; 280/735, 728.1; 324/509

[56] References Cited

U.S. PATENT DOCUMENTS

| | | | |
|---|---|---|---|
| 4,999,775 | 3/1991 | Muraoka | 701/45 |
| 5,357,518 | 10/1994 | Peter | 714/4 |
| 5,422,965 | 6/1995 | Bekki et al. | 280/735 |
| 5,646,454 | 7/1997 | Mattes et al. | 180/282 |
| 5,696,777 | 12/1997 | Hofsaess | 324/509 |
| 5,856,710 | 1/1999 | Baughman et al. | 307/10.1 |

*Primary Examiner*—Albert W. Paladini
*Attorney, Agent, or Firm*—Jimmy L. Funke

[57] ABSTRACT

An improved distributed architecture SIR system wherein the idle voltage of the power and communications bus is regulated by a fault tolerant power supply circuit, and portions of the bus coupled to devices located in a crush zone of the vehicle may be de-coupled from other portions of the bus in the event of a short circuit across the wires of that portion of the bus. The power and communications bus comprises two wires (signal and ground) and the bus ground wire is weakly biased to a reference voltage. A boost power supply referenced to the bus ground establishes the nominal voltage of the signal wire, and supplies charging current over the signal wire to the energy reserve circuits of various devices coupled to the bus. The power supply is transformer-isolated from the bus, and the feedback circuitry for controlling the operation of the power supply senses the bus voltage as coupled through the transformer. Consequently, the power supply retains the ability to regulate the bus voltage in fault conditions where the ground or signal wires of the bus are shorted to vehicle ground or battery voltage. In such conditions, the bus ground shifts from its normal value, and is detected to provide a warning indication to the operator of the vehicle. Open circuit failures of the bus wires are addressed by configuring the bus in a closed ring topology, and short circuits across the bus wires are addressed by configuring the bus so that portions of the bus disposed in one or more crush zones of the vehicle can be de-coupled from the rest of the bus.

7 Claims, 3 Drawing Sheets

FAULT TOLERANT POWER SUPPLY AND BUS TOPOLOGY FOR A DISTRIBUTED ARCHITECTURE SUPPLEMENTAL RESTRAINT SYSTEM

This invention relates to automotive supplemental inflatable restraint (SIR) systems having a distributed architecture characterized by multiple electronic modules communicating via a high-speed power and communication bus, and more particularly to a centralized fault tolerant power supply and bus topology therefor.

BACKGROUND OF THE INVENTION

In general, SIR systems perform a number of functions including crash sensing, diagnostics, signal processing and analysis, and deployment of one or more restraint devices such as frontal or side air bags or seat belt pretensioners. When the system is designed such that the components for performing most or all of these functions are packaged together in a single electronic module, the system architecture may be characterized as centralized. When the system is designed so that the components are separately packaged based on functionality and interconnected by a communications bus, the system architecture may be characterized as distributed.

The selection of centralized vs. distributed architecture depends upon a number of factors, including the number of restraint devices, controller throughput requirements, package size, system cost and assembly considerations. In relatively simple mechanizations involving a small number of restraint devices and limited sensing and processing requirements, the centralized architecture may offer cost and assembly advantages. In relatively complex mechanizations involving a large number of restraint devices and sophisticated sensing and processing requirements, the distributed architecture may offer packaging and processing advantages.

A system architecture of the centralized type is schematically represented by the block diagram of FIG. 1. Referring to FIG. 1, the centralized system comprises a high function central processor and a number of side impact sensors, occupant sensors and restraint initiator modules. The central processor includes frontal acceleration sensor(s), power supply and energy reserve devices, interface circuitry for communicating with the sensor and initiator modules, a microprocessor for processing the sensor signals and executing the deployment algorithm, diagnostic circuitry and firing circuits for each of the restraint initiators. The remote side impact sensors provide information which may be difficult to sense in a central location of the vehicle, and the remote occupant sensors provide information about occupant position that is taken into consideration by the deployment algorithm.

A system architecture of the distributed type is schematically represented by the block diagram of FIG. 2. Referring to FIG. 2, the distributed system still includes a central processor, but the sensors and initiator driver circuits are located remote from the central processor, and communicate with the central processor via the communications bus. The role of the central processor as a communications interface now becomes more important, and other functions such as deployment control may be performed in the remote modules, enabling the functionality of the central processor to be minimized, or even up-integrated into another multi-function controller. Additionally, the flexibility of the system is increased since adding further sensors and/or initiators has only a modest impact on system cost.

Despite the many advantages of the distributed SIR system architecture, a potential disadvantage concerns the tolerance of the system to wiring faults in the communications bus, such as shorts to battery, shorts to ground, open circuits and shorts across the bus wires.

SUMMARY OF THE PRESENT INVENTION

The present invention is directed to an improved distributed architecture SIR system wherein the communications bus (also referred to herein as a power and communications bus) also supplies power to the various devices connected thereto, and the idle voltage of the bus is regulated by a fault tolerant power supply circuit. Additionally, portions of the bus coupled to devices located in a crush zone of the vehicle may be de-coupled from other portions of the bus in the event of a short circuit across the wires of that portion of the bus.

According to the invention, the power and communications bus comprises two wires (signal and ground), and the bus ground is weakly biased to a nominal voltage referenced to the vehicle battery voltage. A boost power supply referenced to the bus ground establishes the nominal voltage of the signal wire, and supplies charging current over the signal wire to the energy reserve circuits of various devices coupled to the bus. The power supply is transformer-isolated from the bus, and feedback circuitry for controlling the operation of the power supply senses the bus voltage as coupled through the transformer. Consequently, the power supply retains the ability to regulate the bus voltage in fault conditions where the signal or ground wires are shorted to vehicle ground or battery voltage. In such conditions, the resulting shift in the bus ground is detected to provide a warning indication to the operator of the vehicle.

Open circuit failures of the bus wires are addressed by configuring the bus in a closed ring topology, and short circuits across the bus wires are addressed by configuring the bus so that portions of the bus disposed in one or more crush zones of the vehicle can be de-coupled from the rest of the bus.

DETAILED DESCRIPTION OF THE DRAWINGS

Figure 1:
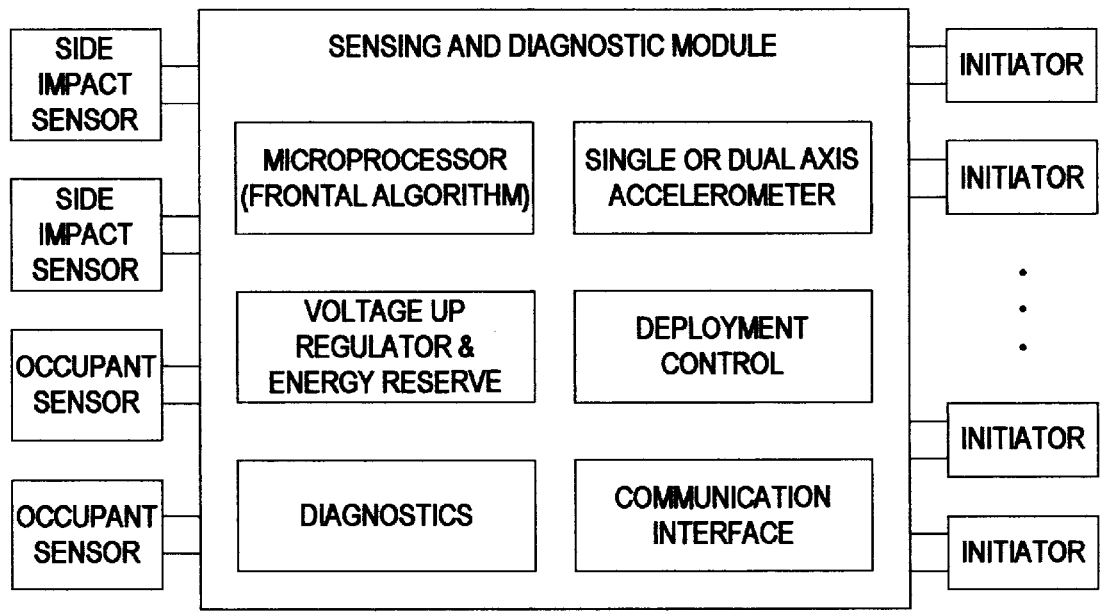
FIG. 1 is schematic diagram of a SIR system having a centralized architecture.
Figure 2:
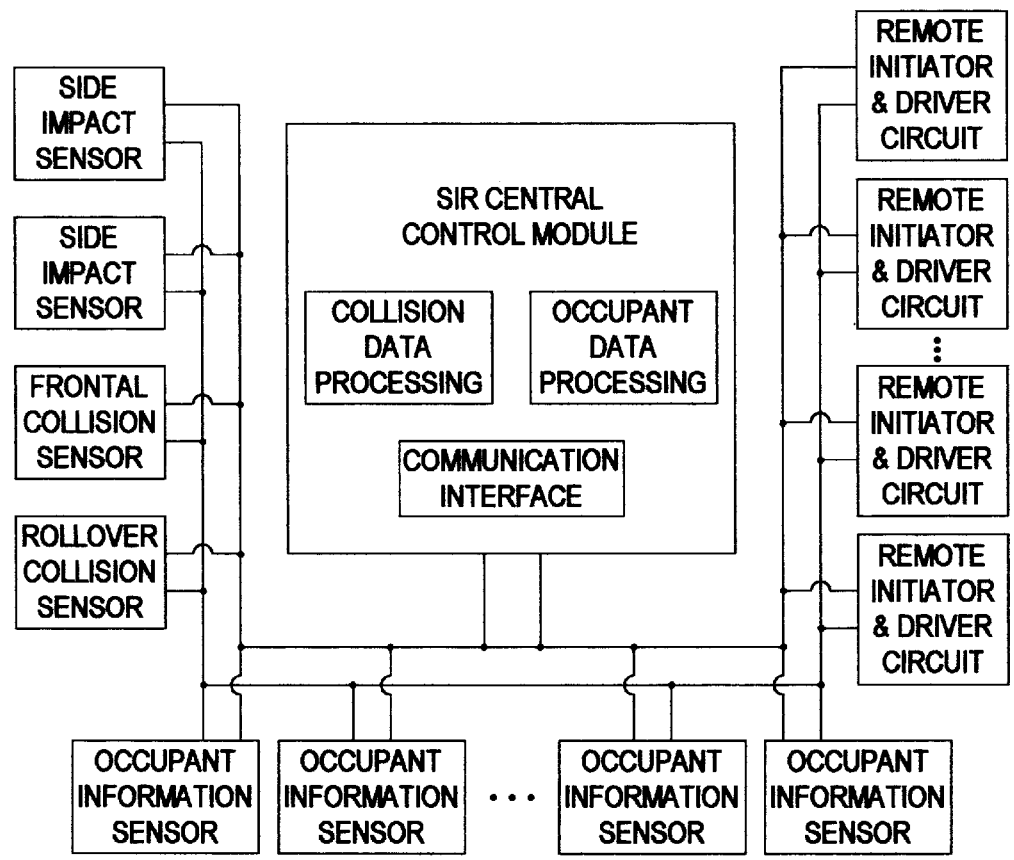
FIG. 2 is schematic diagram of a SIR system having a distributed architecture.
Figure 3:
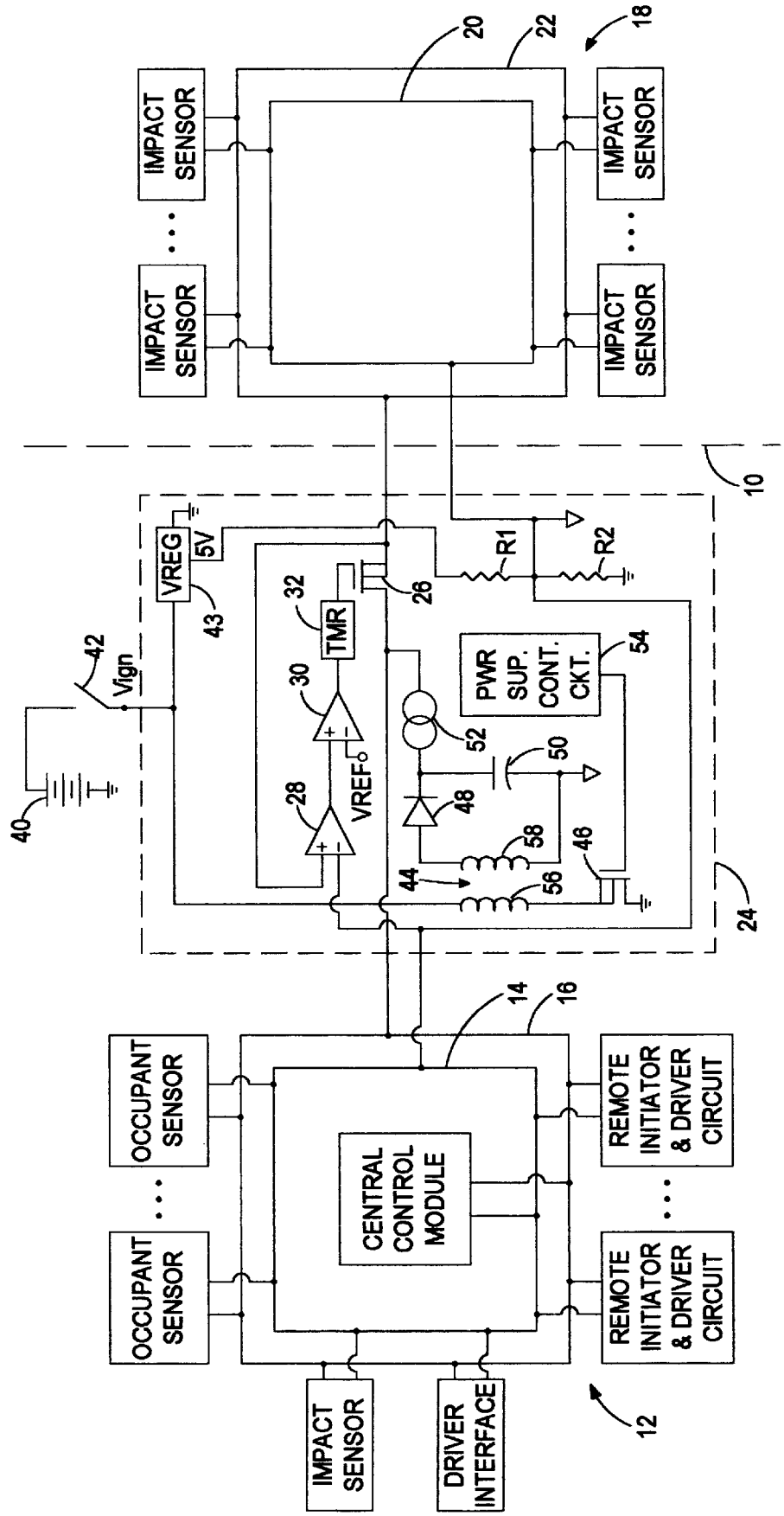
FIG. 3 is a system block diagram of a distributed SIR system according to this invention, including a bus-isolated power supply system.

An overall diagram of a distributed SIR system for a motor vehicle according to this invention is depicted in FIG. 3. The system is distributed in the sense of FIG. 2, described above, but is further distributed based on defined zones of the vehicle. The broken line 10 generally designates a vehicle partition defining an inner or protected zone to the left of line 10, and an outer or possible crush zone to the right of line 10. A first closed-ring power and communication bus 12 comprising the bus wires 14 and 16 is disposed in the inner zone of the vehicle, while a second closed-ring power and communication bus 18 comprising the bus wires 20 and 22 is disposed in the outer zone. A power supply module 24, also disposed in the inner zone of the vehicle, interconnects the first and second buses 12, 18. The bus wires 14 and 20, defined as bus ground, are directly coupled through the module 24, while the bus wires 16 and 22 are coupled through the source-drain circuit of MOSFET 26.

In general, devices located in the inner zone of the vehicle (such as in and around the passenger compartment) are coupled to the first bus 12, and devices located in the outer zone are coupled to the second bus 18. The devices in the inner zone may include, for example, occupant position sensors, remote squib drivers and initiators, certain impact or rollover sensors, and a driver interface module. The devices in the outer zone primarily include certain impact sensors, such as those located near the front of the vehicle. Normally, the module 24 couples the first and second buses so that they function as a single bus structure, whereas in the event of a crash that creates a short circuit between the bus wires 20 and 22 in the crush zone, the module 24 turns off MOSFET 26 to isolate the second bus 18 so that the devices connected to the first bus 12 may continue to communicate, and possibly deploy appropriate restraints.

The voltage differential across the bus wires 22 and 14/20 is detected by the operational amplifier 28, and compared to a reference voltage VREF by comparator 30. The output of comparator 30 is applied to a timer 32, which biases MOSFET 26 non-conductive to de-couple the bus wires 16, 22 if the detected voltage differential is less than VREF for more than a predetermined time, such as 50–100 microseconds. The timer function is required to distinguish a short circuit failure from normal communications which momentarily equalize the voltage across the bus wires.

In addition to de-coupling the bus wires 16 and 22 in the event of a bus short circuit in a vehicle crush zone, the module 24 is coupled to the vehicle battery 40 for establishing the bus ground voltage and an idle voltage differential between the signal and ground bus wires. Additionally, the power supply provides operating current to the various modules connected to the buses 12, 18. Ideally, the voltage is boosted to a value higher than the typical battery voltage of 12 volts in order to provide adequate energy reserve in the event the vehicle battery 40 becomes disconnected from the SIR system in a crash event. A description of an SIR system meeting this general description is disclosed in co-pending U.S. patent application Ser. No. 09/012,975, filed on Jan. 26, 1998, and assigned to the assignee of the present invention.

The nominal bus ground is weakly established by a resistive voltage divider comprising the resistors R1 and R2 connected in series between battery ground and the 5-volt output of voltage regulator (VREG) 43. The junction between resistors R1 and R2 defines the bus ground (designated by a triangular symbol), and is connected to the bus wires 14, 20. The voltage differential across the bus wires 14, 16 or 20, 22 is established by a power supply comprising isolation transformer 44, MOSFET 46, diode 48, capacitor 50, current source 52, and a power supply control circuit 54 for controlling the conduction of MOSFET 46. The primary winding 56 of transformer 44 is coupled to the vehicle battery 40 through ignition switch 42, and the connection across battery 40 is periodically completed through MOSFET 46 under control of control circuit 54. Energy stored in the primary winding 56 is coupled to the secondary winding 58 and used to charge capacitor 50 through diode 48. The current source 52 couples the capacitor 50 to bus line 16. In the illustrated embodiment, current source 52 sources a nominal current of 320 mA, a value selected based on the quiescent operating current requirements of the remote mounted devices while enabling such devices to slew the bus voltage at a suitable rate for communication purposes.

Figure 4:
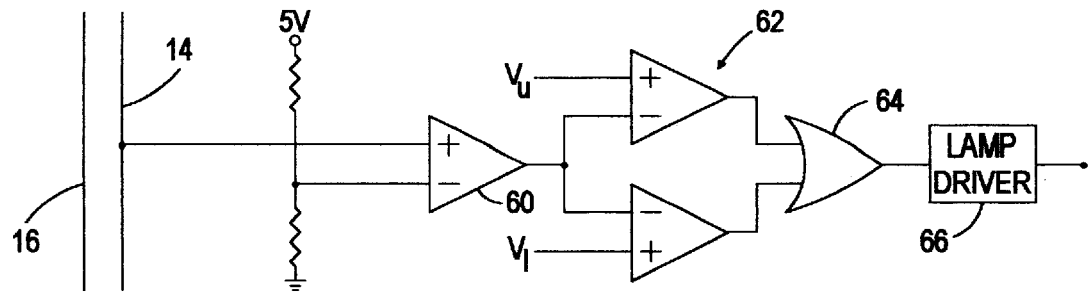
FIG. 4 is a diagram of a fault detection circuit for the SIR system of FIG. 3.

Significantly, the power supply components coupled to secondary winding 58 are referenced to bus ground, not battery ground, allowing the ground voltage of the bus to float relative to battery ground. In other words, the system is tolerant to faults conditions such as wiring harness pinching which bias the bus ground voltage higher or lower than the nominal value. Nevertheless, a circuit such as depicted in FIG. 4 is used, either within module 24 or the driver interface module coupled to bus 12, to detect such a condition and to advise the driver that the SIR system should be serviced soon. Referring to FIG. 4, the operational amplifier 60 compares the actual bus ground voltage to a reference voltage corresponding to the voltage produced by resistors R1 and R2 of module 24. If the voltage differential falls outside a window defined by the window comparator 62 having upper and lower limits Vu, Vl, the OR-gate 64 activates a lamp driver 66 to produce a suitable warning.

Figure 5:
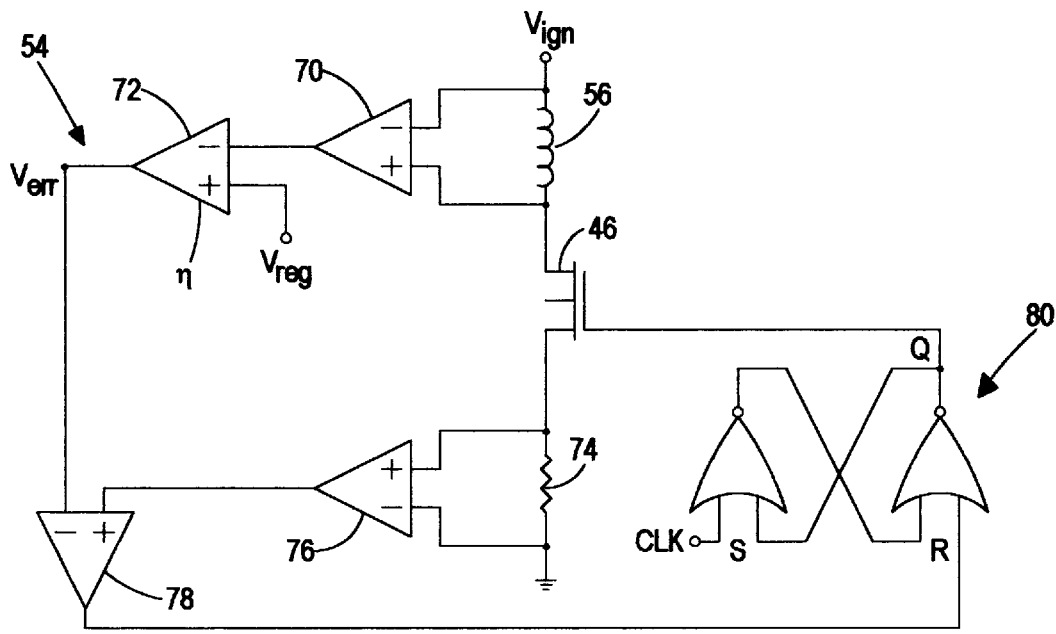
FIG. 5 is a diagram of a control circuit for the power supply system of FIG. 3.

Additional fault tolerance is achieved according to this invention by using transformer 44 to isolate power supply control circuit 54 from the bus voltage. As shown in FIG. 5, and demonstrated in the graphs of FIG. 6, the control circuit 54 develops a bus voltage error signal $V_{err}$ based on the voltage across the primary winding 56 of transformer 44 when MOSFET 46 is biased off. The operational amplifier 70 is coupled across primary winding 56, and its output voltage is compared with a reference voltage $V_{reg}$ by a slew rate limited operational amplifier 72 to form the bus voltage error signal $V_{err}$. A resistive shunt 74 is connected between MOSFET 46 and battery ground, and the operational amplifier 76 detects the voltage across shunt 74 as a measure of the current through the primary winding 56. Such voltage is compared with the error voltage Verr by comparator 78 to develop a turn-off control signal for MOSFET 46 which is applied to the Reset input of flip-flop 80. A clock signal (CLK) periodically triggers the Set input, and the Q-output is applied to the gate of MOSFET 46.

Figure 6:
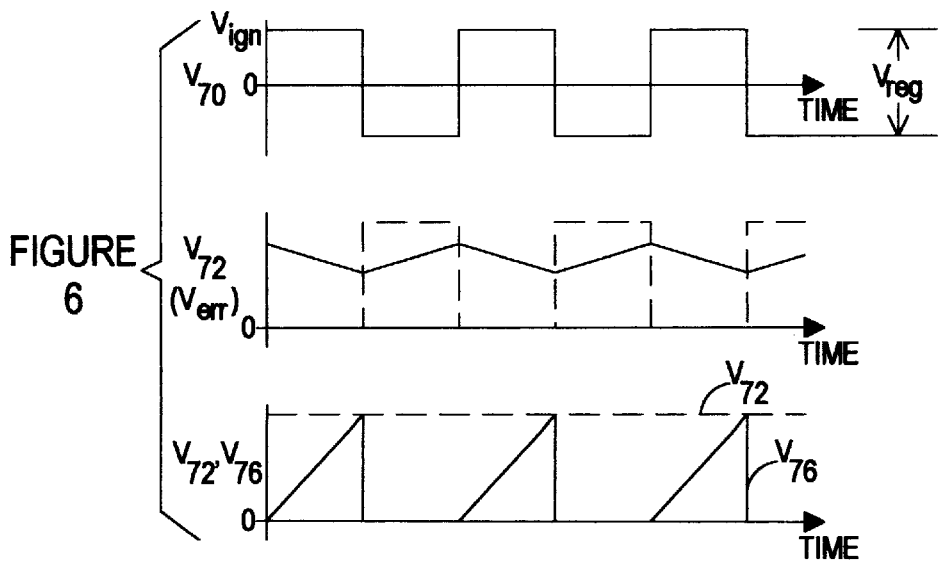
FIG. 6 graphically depicts the operation of the control circuit of FIG. 5.

Referring to FIG. 6, the top graph depicts the output voltage $V_{70}$ of amplifier 70 when MOSFET 46 is operated at a duty cycle of approximately 50%, with the bus voltage approximately equal to $V_{reg}$. The middle graph depicts the output voltage $V_{72}$ of amplifier 72, with (solid trace) and without (broken trace) slew rate limiting. The bottom graph depicts the output voltages $V_{72}$ and $V_{76}$ of amplifiers 72 and 76, respectively. When MOSFET 46 is off, the voltage across the primary winding 56 is clamped at a desired regulation voltage $V_{reg}$, shown in the top graph of FIG. 6. Clamping the primary voltage regulates the output voltage across capacitor 50 to the desired level based on the turns ratio of the transformer 44 and the duty cycle of MOSFET 46. The duty cycle of MOSFET 46 is controlled by comparing the output of error amplifier 72 to the current flowing through MOSFET 46 using comparator 78. Without slew rate limiting the error voltage $V_{72}$ would resemble the broken trace shown in the middle graph, but with slew rate limiting resembles the solid trace. The output voltage $V_{76}$ of amplifier 76 forms a ramp or saw-tooth waveform for comparison with the relatively constant error voltage $V_{err}$ by comparator 78. Since the ramp voltage $V_{76}$, is based on the current through MOSFET 46, the voltage regulation function not affected by changes in the ignition voltage $V_{ign}$. Of course, it would also be possible to generate a ramp voltage independent of the current through MOSFET 46, but with a slope proportional to $V_{ign}$ so that the voltage regulation function would be similarly compensated for changes in $V_{ign}$. In operation, the CLK signal periodically turns on MOSFET 46, and comparator 78 resets flip-flop 80 to turn off MOSFET 46 when the sensed current signal $V_{76}$ exceeds the error voltage $V_{err}$. If the bus voltage falls below $V_{reg}$, the error voltage $V_{err}$ will increase, resulting in longer on-times for MOSFET 46 until the bus voltage recovers. If the bus voltage rises above $V_{reg}$, the error voltage $V_{err}$ will decrease, resulting in shorter on-times for MOSFET 46.

Contrary to the above-described circuit, conventional power supply circuits sample the output voltage through a resistive divider and compare the sampled voltage to a reference to form an error signal that is used to control the switching transistor. This results in an output voltage that is ground referenced; consequently, voltage regulation is lost if the output line (bus wire 16, 22) were to become shorted to either positive battery voltage or battery ground. Thus, the conventional approach is considered to be intolerant to wiring harness faults of this type.

In contrast, the isolated power supply configuration of the present invention retains its ability to regulate the bus voltage even if the bus wire 16, 22 is shorted to battery or ground due to a wiring harness fault. This is because the output voltage is not referenced to battery ground, but to bus ground. Although the bus ground could be maintained entirely isolated from battery ground, it is preferably normally biased with respect to battery ground (by divider resistors R1 and R2) so that deviations from the normal value can be detected to provide a failure indication to the driver of the vehicle. For example, if the bus wire 16, 22 were shorted to battery ground (0V), the bus ground wire 14, 20 would be driven to −25V, assuming a normal regulated output voltage of 25V, and a normal bus ground of 5V. The desired output voltage differential on the bus wires is maintained, so that communications and operability of the modules coupled to the buses 12, 18 is unhampered. However, the deviation of the bus ground from its normal value can be detected, as described above in reference to FIG. 4, and used provide a failure indication to the driver. Thus, the system of the present invention is considered to be tolerant of wiring harness failures that result in the shorting of either of the bus wires to battery voltage or battery ground.

Wiring harness failures that result in the shorting of one bus wire to the other in a crush zone of the vehicle are addressed by the ability of the SIR system to de-couple portions of the bus with MOSFET 26. The detection of this type of failure is provided by the operational amplifier 28, comparator 30 and timer 32, as described above. When the MOSFET is biased non-conductive in response to the detection of such a failure, the crush zone bus loop 18 becomes isolated from the vehicle interior wiring, and the short circuit has no impact on the operation of the rest of the system. While only one crush zone bus is shown, it will be apparent that two or more could be employed. Finally, as also described above, the system of the present invention is tolerant of open-circuit bus wire failures by virtue of the ring topology.

While this invention has been described in reference to the illustrated embodiment, it is expected that various modifications in addition to those suggested above will occur to those skilled in the art. For example, the MOSFET 26 and its control circuits could be packaged separate from the power supply module 24. Other packaging variations are also possible. In this regard, it will be understood that this invention is not limited to the illustrated embodiment, and that systems incorporating various modifications may fall within the scope of this invention, which is defined by the appended claims.

The embodiments of the invention in which an exclusive property or privilege is claimed are defined as follows:

1. A vehicular supplemental restraint system including a plurality of sensing modules and deployment modules in distributed locations of the vehicle, comprising:

a power and communications bus coupled to each of said sensing and deployment modules for supplying power to said modules and for enabling communication among said modules, said bus including a ground wire and a power wire;

a power supply circuit coupled to a vehicle storage battery and to said bus for developing a regulated voltage across the ground and power wires of said bus, said power supply including a transformer having primary and secondary windings, a power device switched on and off to periodically connect said primary winding to said vehicle battery, an energy storage circuit referenced to the ground wire of said bus and connected between said secondary winding and the power wire of said bus for transferring energy coupled between said primary and secondary windings to the power wire of said bus; and a control circuit for controlling the switching of said power device based on a measured voltage across said primary winding while said power device is switched off.

2. The system of claim 1, wherein said control circuit comprises:

a switching device periodically activated to switch on said power device;

a first amplifier for measuring the voltage across said primary winding while said power device is switched off;

a second amplifier for forming an error signal based on a difference between said measured voltage and a reference voltage corresponding to a desired voltage differential between said ground and power wires of said bus; and a comparator for resetting said switching device to switch off said power device when a feedback signal corresponding to a current in said primary winding exceeds said error signal.

3. The system of claim 1, wherein said power and communications bus includes a first portion disposed in a protected zone of said vehicle and a second portion disposed in a possible crush zone of said vehicle, the power wire of said first and second portions being coupled through a normally-closed switching device, and the system includes a circuit for switching said switching device to an open state to de-couple said first and second portions of said bus if the ground and power wires in the second portion of said bus become shorted together.

4. The system of claim 3, wherein communication signal on said bus are distinguished from shorting by a timed duration.

5. The system of claim 3, where the first and second portions of the bus are configured in closed rings coupled by the normally closed switching device for tolerance to open circuits.

6. The system of claim 1, where the ground wire of the bus is biased to a nominal value relative to battery ground, and deviations from the nominal value are detected to inform the driver of a wiring harness fault.

7. The system of claim 1, wherein the bus is configured in a closed ring for tolerance to open circuits.

* * * * *